C. W. HODGES.
ANTISLIP DEVICE FOR VEHICLE WHEELS.
APPLICATION FILED FEB. 5, 1917.
1,285,179.
Patented Nov. 19, 1918.
2 SHEETS—SHEET 1.
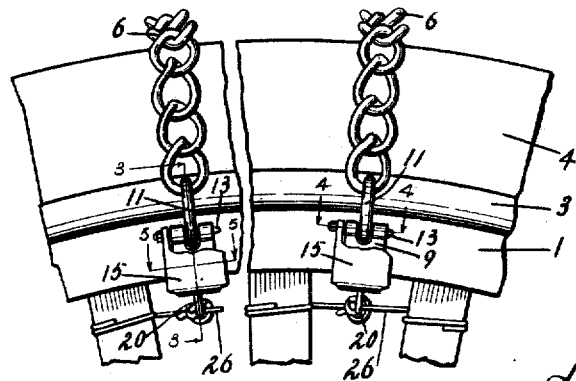
Fig. I.
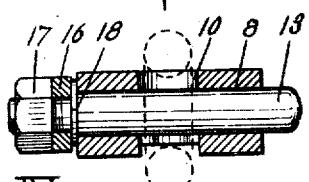
Fig. IV.
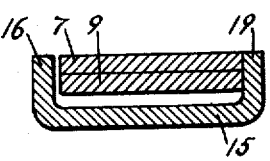
Fig. V.
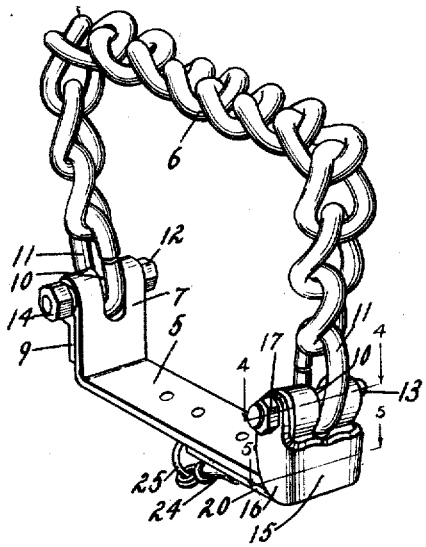
Fig. II.
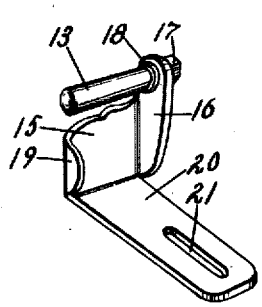
Fig. VI.
WITNESSES:
Lenn Gilman
Luther Blake
INVENTOR.
CHAUNCEY W. HODGES.
BY Chappell & Earl
ATTORNEYS.

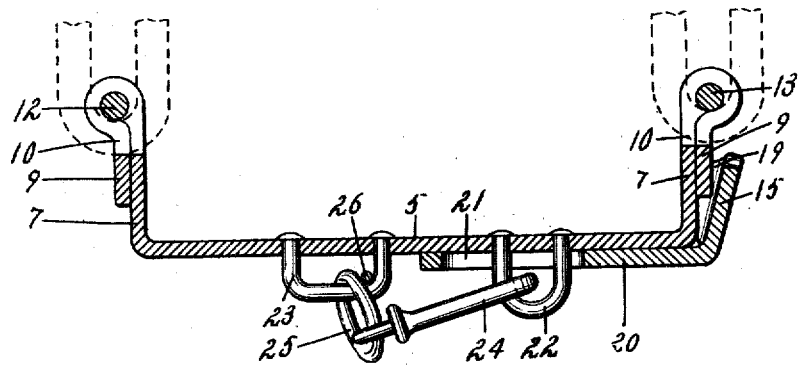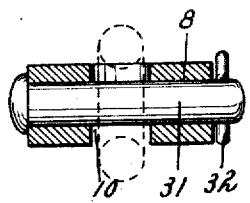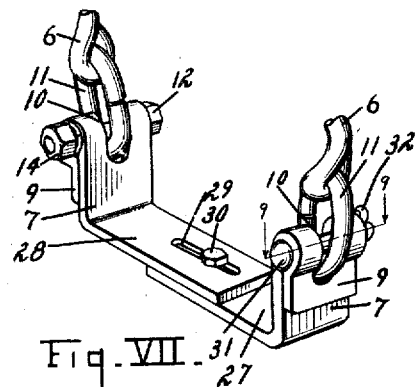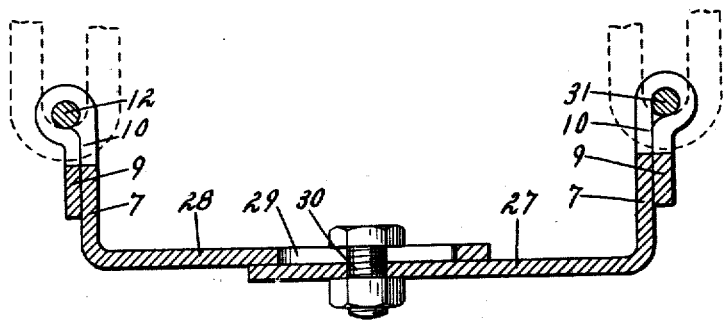

UNITED STATES PATENT OFFICE.

CHAUNCEY W. HODGES, OF GRAND RAPIDS, MICHIGAN.

ANTISLIP DEVICE FOR VEHICLE-WHEELS.

1,285,179.

Specification of Letters Patent.

Patented Nov. 19, 1918.

Application filed February 5, 1917. Serial No. 146,710.

*To all whom it may concern:*

Be it known that I, CHAUNCEY W. HODGES, a citizen of the United States, residing at Grand Rapids, county of Kent, State of Michigan, have invented certain new and useful Improvements in Antislip Devices for Vehicle-Wheels, of which the following is a specification.

This invention relates to improvements in anti-slip devices for vehicle wheels.

The main objects of this invention are:

First, to provide an improved anti-slip device which is quickly applied and removed and one which when applied, is very secure.

Second, to provide an improved anti-slip device having these advantages in which the tread chains may be conveniently renewed as occasion requires.

Third, to provide an improved anti-slip device for vehicle wheels which is especially adapted for heavy vehicles, such as trucks.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail side elevation of a portion of a vehicle wheel showing my improved anti-slip device applied thereto.

Fig. II is a perspective view of one of my anti-slip devices.

Fig. III is a detail longitudinal section on a line corresponding to line 3—3 of Fig. I, parts being shown in full lines, the tread chain being indicated by dotted lines.

Fig. IV is a detail cross section on a line corresponding to line 4—4 of Figs. I and II.

Fig. V is a detail section on a line corresponding to line 5—5 of Figs. I and II, showing the relation of the hasp to the yoke.

Fig. VI is a perspective view of the pin hasp.

Fig. VII is a perspective view of a modified structure in which the yoke is adjustable, a portion of the tread chain being broken away.

Fig. VIII is a central longitudinal section of the modification of Fig. VII.

Fig. IX is a transverse section on a line corresponding to line 9—9 of Fig. VIII.

In the drawing similar reference characters refer to similar parts throughout the several views, and the sectional views are taken looking in the direction of the little arrows at the ends of the section lines.

Referring to the drawing, 1 represents the felly of a vehicle wheel, 2 the spokes, 3 the rim, and 4 the tire. These parts are shown in conventional form, being shown merely to illustrate the application of my improved anti-slip device in use.

My improved anti-slip device comprises a body member or yoke 5 and the tread chain 6. The body member or yoke 5 is preferably formed of a flat bar of iron, the ends of the arms 7 of the yoke being turned upon themselves to form eyes 8, the ends 9 being preferably lapped against the parts upon which they are folded and secured by spot welding.

The arms of the yoke are slotted through the eyes at 10 to receive the end links 11 so that the pins 12 and 13 disposed through the eyes engage the links and secure the chain to the yoke.

The pin 12 is provided with a nut 14. The pin 13 is carried by the hasp member 15 which has a flange-like arm 16 at one edge through which the pin is arranged and secured by the nut 17, the pin having a shoulder 18 on the inside of the arm (see Fig. IV). The hasp member is provided with a retaining flange 19 disposed oppositely to the flange-like arm 16, so that when the hasp is in its closed position the retaining flange 19 closes over the arm, thereby retaining the pin and at the same time permitting the pin being withdrawn when the hasp is swung out or opened. The hasp is provided with an arm 20 having a slot 21 therein adapted to engage the staple 22 on the cross portion of the yoke. The second staple 23 is provided for retaining the hook 24. The hook is connected to the staple 23 by means of the link 25. The hook may be an ordinary snap, such as a harness snap or the like.

The staple 23 is provided so that the retaining means are not likely to be lost.

By this simple arrangement I provide a means whereby the device may be quickly applied to or removed from a wheel and when applied is very secure.

To prevent loss in the event of the chain breaking I preferably provide the ties 26 which may be pieces of wire threaded through the staples 23 and wrapped around adjacent spokes 2, as shown in Fig. I, or suitable straps or other means may be provided for this purpose.

In the modification shown in Figs. VII and VIII the yoke is made adjustable. In this construction the yoke is formed of two members 27 and 28 each provided with an arm and overlapping cross member portions. The cross portion of the yoke member 28 is slotted at 29 to receive the bolt 30 carried by the cross portion of the yoke member 27.

Instead of the hasp retaining means the pin 31 is retained by a cotter pin 32.

My improved anti-slip device is simple and at the same time is very strong and durable. It has the further advantage of being quickly applied and removed as occasion may require without the use of tools.

Having thus described my invention, what I claim as new and desire to secure by Letters Patent, is:

1. In an anti-slip device for vehicle wheels, the combination of a tread member, a rim yoke having an arm provided with an eye adapted to receive a tread member engaging pin, said arm being longitudinally slotted through said eye to receive said tread member, a pin, a hasp member on which said pin is mounted to engage said eye, said hasp member being adapted to engage the yoke and retain the pin when the hasp is closed and permit its disengagement when the hasp is opened, and means for retaining said hasp in its closed position.

2. In an anti-slip device for vehicle wheels, the combination of a tread member, a rim yoke provided with an arm having an eye adapted to receive a tread member engaging pin, a pin, a hasp member on which said pin is mounted to engage said eye, said hasp member being adapted to engage the yoke and retain the pin when the hasp is closed and permit its disengagement when the hasp is opened, and means for retaining said hasp in its closed position.

3. In an anti-slip device for vehicle wheels, the combination of a tread member, a bar-like rim yoke having one arm folded upon itself to provide an eye adapted to receive a tread member engaging pin, said arm being longitudinally slotted through said eye to receive links of a chain, link engaging pins, a hasp member having a flange-like arm on which one of said pins is mounted to engage the eye of one yoke arm, and an opposed retaining flange engaging the arm and retaining the pin when the hasp is closed but permitting its disengagement when the hasp is opened, and retaining means for said hasp.

4. The combination of a body member having an arm folded upon itself providing an eye, said arm being longitudinally slotted through said eye to receive a coacting member, a pin, a hasp member having a flange-like arm on which said pin is mounted to engage said eye, and an opposed retaining flange engaging the arm and retaining the pin when the hasp is closed but permitting its disengagement when the hasp is opened, said hasp being provided with a slotted staple engaging arm adapted to close against the body member, a pair of staples on the body member, one of which is positioned to engage said hasp slot when the hasp member is closed, and a hasp retaining member connected to the other staple to coact with the hasp engaging staple.

5. The combination of a body member having an arm folded upon itself providing an eye, said arm being longitudinally slotted through said eye to receive a coacting member, a pin, a hasp member having a flange-like arm on which said pin is mounted to engage said eye, and an opposed retaining flange engaging the arm and retaining the pin when the hasp is closed but permitting its disengagement when the hasp is opened, said hasp being provided with a slotted staple engaging arm adapted to close against the body member, a staple on the body member positioned to engage said hasp slot when the hasp member is closed, and a hasp retaining member.

6. The combination of a body member folded upon itself at one end to provide an eye adapted to receive a link engaging pin, said member being longitudinally slotted through said eye to receive the link of a chain, a link engaging pin, a hasp member having a flange-like arm on which said pin is mounted to engage said eye, said hasp member being adapted to engage the yoke and retain the pin when the hasp is closed and permit its disengagement when the hasp is opened, and means for retaining said hasp in its closed position.

7. The combination of a body member having an eye adapted to receive a coupling pin, a hasp member on which said pin is mounted adapted to engage the yoke and retain the pin when the hasp is closed and permit its disengagement when the hasp is opened, and means for retaining said hasp in its closed position.

In witness whereof, I have hereunto set my hand and seal in the presence of two witnesses.

CHAUNCEY W. HODGES. [L. S.]

Witnesses:
LUELLA G. GREENFIELD,
GRACE B. THOMPSON.